June 20, 1944.  A. B. CADMAN  2,351,598

ELECTROMAGNETIC FRICTION DEVICE

Filed Dec. 3, 1941  2 Sheets-Sheet 1

INVENTOR.
ADDI B. CADMAN
BY
ATTORNEYS

June 20, 1944.    A. B. CADMAN    2,351,598
ELECTROMAGNETIC FRICTION DEVICE
Filed Dec. 3, 1941    2 Sheets-Sheet 2

INVENTOR.
ADDI B. CADMAN
BY
Parker, Carlson, Pitzner & Hubbel
ATTORNEYS

Patented June 20, 1944

2,351,598

UNITED STATES PATENT OFFICE 2,351,598

ELECTROMAGNETIC FRICTION DEVICE

Addi B. Cadman, Beloit, Wis., assignor to Warner Electric Brake Manufacturing Company, South Beloit, Ill., a corporation of Illinois Application December 3, 1941, Serial No. 421,427

6 Claims. (Cl. 188—164)

This invention relates to improvements in electromagnetic friction devices, particularly those comprising an annular magnet having concentric poles with faces terminating at a friction surface adapted for gripping engagement with a flat armature ring.

In devices of the above character, the torque capable of being derived by frictional gripping engagement of the magnet and armature drops off materially as a result of immersion of the parts in a liquid such as water and the decreased output persists for a substantial interval even though the parts are in rubbing contact. This reduction in output is objectionable in electric brakes for certain types of vehicles.

The general object of the present invention is to increase the rate of recovery of normal output following immersion of the device of the above character.

The invention also resides in the novel structural character of the means by which recovery is accelerated.

Other objects and advantages of the invention will become apparent from the following detailed description taken in connection with the accompanying drawings, in which Figure 1 is a fragmentary sectional view of an electrically controlled brake having a friction device embodying the features of the present invention, the section being taken along the line 1—1 of Fig. 2.

Figure 1:
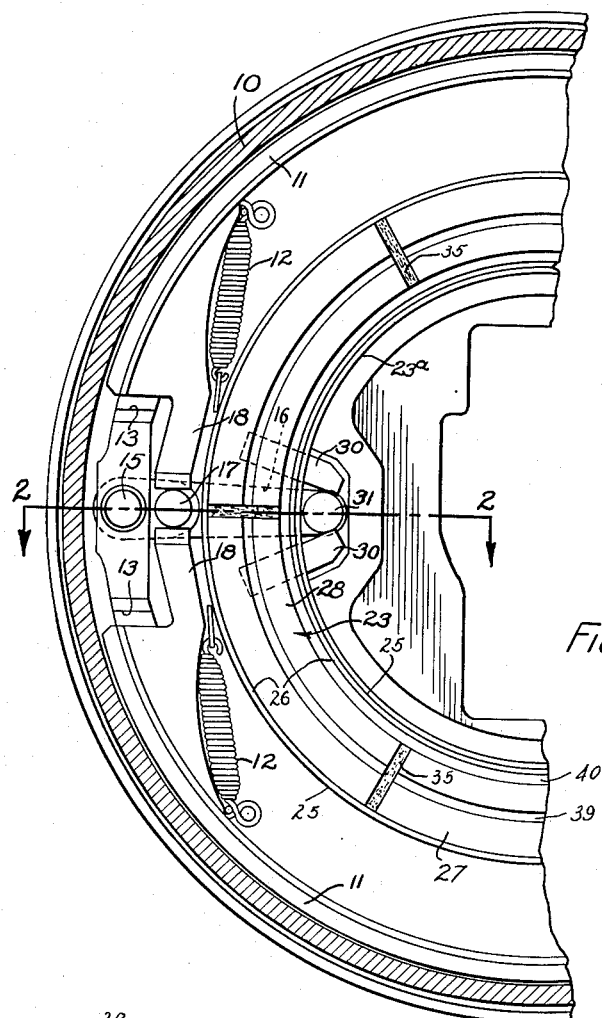
Figure 2:
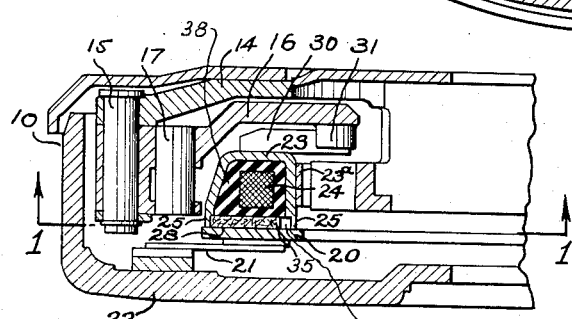
Fig. 2 is a fragmentary sectional view taken along the line 2—2 of Fig. 1.
Figure 3:
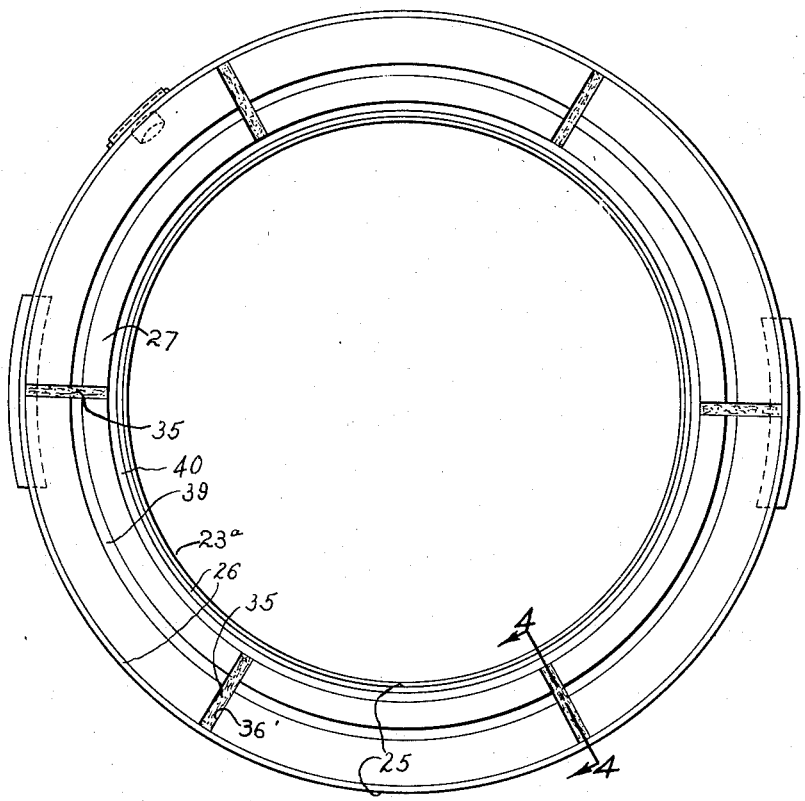
Fig. 3 is an enlarged face view of the magnet.
Figure 4:
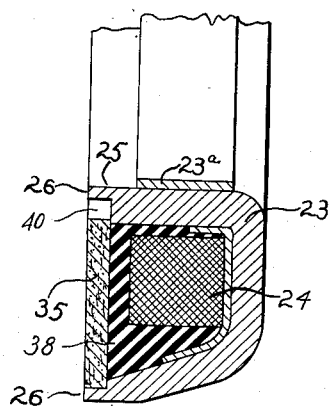
Fig. 4 is a section taken along the line 4—4 of Fig. 3.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the drawings, the invention is embodied, for purposes of illustration, in a brake adapted to be applied to a vehicle and comprising generally a rotatable drum 10 and friction shoes 11 extending around the inner drum surface for expansion into gripping engagement therewith. The shoe ends are disposed adjacent each other and normally drawn by springs 12 against stops 13 rigid with a non-rotatable anchor member 14.

Mounted on a pivot 15 between the stops is a lever 16 carrying a stud 17 disposed between the ends of brackets 18 on the shoes and operable upon swinging of the lever in either direction away from the normal brake-released position shown to move one shoe end or the other away from its stop and thereby expand the shoes to apply the brake.

The friction device in which the present invention is embodied includes an armature ring 20 having a flat inwardly facing friction surface and supported concentric with the drum axis and for a limited degree of floating axial movement by a plurality of flexible metal strips 21 arranged as secants of the armature ring with their opposite ends secured to the drum flange 22 and the armature ring respectively. The magnet comprises a ring 23 of magnetic material and of U-shaped cross-section rotatably mounted on a bearing ring 23ª on the anchor member. An annular winding 24 is disposed between the two magnet poles 25 whose radially spaced faces 26 are in a common plane, the winding being held in place by a suitable hardened cement 38. Segments 27 of friction material are disposed between the poles with their friction faces 28 substantially flush with the pole faces 26 so as to sustain the major burden of the gripping engagement between the magnet and armature and thereby minimize wearing off of the pole faces. Each segment 27 is held in place and backed by the hardened cement and preferably is divided into two parts separated by a narrow circumferentially extending groove 39 and the inner part is spaced from the inner magnet pole to provide a second annular groove 40.

When the magnet winding 24 is energized with the drum rotating and the parts in brake-released position as shown in Fig. 1, a magnetic flux is created in the closed magnetic circuit through the magnet and armature rings producing gripping engagement between the friction faces. As the magnet thus moves with the armature in either direction, a lug 30 rigid with the magnet engages a stud 31 on the lever 16 causing one shoe end to be moved away from its anchor and the shoes to be expanded within the drum. Slippage then occurs in the friction faces and the brake remains applied until the magnet is deenergized whereupon the parts are returned to brake-released position by the action of the springs 12.

Presumably, the reduction in output of a magnetic friction device of the above character following immersion in a liquid is attributable to the adherence of a liquid film to the coacting friction surfaces which film is not broken readily by rubbing contact between these faces even though this occurs under considerable pressure. I have discovered that the breaking up of this liquid film and the speed of recovery of the normal torque output following immersion may be accelerated appreciably by embedding granular material such as fine abrasive in one of the friction faces preferably in areas annularly spaced around this face. Particles of ordinary abrasive of approximately No. 240 grit have been found satisfactory.

As shown in the drawing, these particles are held together by a suitable binder to form a narrow strip or bar 35 which herein is set in a radial slot 36 defined by the adjacent ends of friction segments constituting the ring 27. The bars are annularly spaced around the magnet face and received in the slots with a press fit, its outer surface being substantially flush with the friction face of the magnet.

It has been found that the abrasive mounted as above described produces a marked increase in the speed of recovery of full braking torque after immersion in water. Presumably, this action is due to the fact that the abrasive particles project slightly above the active friction face of the magnet into the liquid film held between the two faces, such particles acting during relative rotation between the magnet and the armature to break up this film and cause it to be dissipated more quickly.

The grooves 39 and 40 also assist in speeding up recovery of the full brake torque. Presumably, this is due to the fact that they provide a ready exit for the water becoming trapped between the friction faces. Also, because of the inner groove 40, the inner magnet pole remains unconfined and is free to bend laterally so that there is no possibility of distortion of the magnet face due to heating and cooling of the magnet.

I claim as my invention:

1. An electromagnetic friction device having, in combination, a magnet element and an armature element having flat annular faces adapted for axial gripping engagement during energization of the magnet element, and means carried by and extending transversely of one of said elements and presenting abrasive particles disposed substantially flush with the face of the supporting element.

2. An electromagnetic friction device having, in combination, a magnet element and an armature element having flat annular faces adapted for axial gripping engagement during energization of the magnet element, and an abrasive strip carried by and extending transversely of one of said elements and exposed at the friction face thereof.

3. An electromagnetic friction device having, in combination, a magnet element and an armature element having flat annular faces adapted for axial gripping engagement during energization of the magnet element, and means providing an abrasive area on the face of one of said elements.

4. An electromagnetic friction device having, in combination, a magnet element and an armature element having flat annular faces adapted for axial gripping engagement during energization of the magnet element, one of said faces being composed of non-metallic friction material, and means incorporated in said non-metallic face so as to be engageable with the other element and operable automatically during relative rotation between the elements following immersion thereof in a liquid to dissipate the film of liquid retained between the faces.

5. An electromagnetic friction device comprising a magnet ring and an armature ring adapted for axial gripping engagement, one of said rings having a friction face composed of non-metallic material, and means in said friction face having different physical characteristics than said non-metallic material and acting to increase the rate of recovery of the normal output of said device following immersion of the device in a liquid.

6. An electromagnetic friction device having, in combination, a magnet element and an armature having flat annular faces adapted for axial gripping engagement during energization of the magnet element, and abrasive particles bonded together to form a bar, said bar being set in one of said elements and presenting to the other element an area of said abrasive particles substantially flush with the face of the supporting element.

ADDI B. CADMAN.